United States Patent [19]
Capria

[11] Patent Number: 6,050,132
[45] Date of Patent: Apr. 18, 2000

[54] METHOD AND APPARATUS FOR HYPERBARIC CHAMBER GAS DISCHARGE AND PRESSURE MANAGEMENT

[76] Inventor: Michael Capria, 11706 Plumosa Rd., Tampa, Fla. 33618

[21] Appl. No.: 09/097,511

[22] Filed: Jun. 15, 1998

[51] Int. Cl.[7] .................................................. G01M 3/02
[52] U.S. Cl. .................................................................. 73/37
[58] Field of Search ........................ 128/200.24, 202.12, 128/202.2, 202.27, 205.26, 204.18; 600/21, 22; 482/13, 148; 73/37, 49.2, 49.3, 52, 426

[56] References Cited

U.S. PATENT DOCUMENTS

| | | |
|---|---|---|
| 3,877,427 | 4/1975 | Alexeer et al. . |
| 4,033,247 | 7/1977 | Murphy . |
| 4,452,242 | 6/1984 | Bänziger . |
| 4,633,859 | 1/1987 | Raneau . |
| 4,784,129 | 11/1988 | Garraffa . |
| 4,784,130 | 11/1988 | Kenyon . |
| 4,798,521 | 1/1989 | Schmidt . |
| 5,383,648 | 1/1995 | Pipinias . |
| 5,398,678 | 3/1995 | Gamow ............................... 128/205.26 |
| 5,488,967 | 2/1996 | Minami . |
| 5,664,600 | 9/1997 | Palmer . |
| 5,685,293 | 11/1997 | Watt ..................................... 128/202.27 |
| 5,688,236 | 11/1997 | Gragg . |

OTHER PUBLICATIONS

Scott Aviation Scott Aviox Portable Oxygen Breathing Units, Lancaster, NY, (No Date).

*Primary Examiner*—William Oen

[57] ABSTRACT

Method for regulating hyperbaric chamber pressure at a prescribed level while a continuous supply of fresh gas flows into the hyperbaric chamber. Apparatus consists of a hermetically sealed pressure vessel plenum with a cavity that contains a gas regulating device. Sealed pressure piping means connects the gas regulating device intake to a hyperbaric chamber port. Sealed pressure piping means connects the gas regulating device vent though the plenum housing to the atmosphere. The plenum cavity has a port with a valve through which sealed piping means receives gas pressure from the hyperbaric chamber. Convenient management of hyperbaric chamber pressure at a determined pressure level can occur with closure of plenum valve during hyperbaric chamber pressurization. After closure of plenum valve any additional gas flow into hyperbaric chamber will vent through the gas regulating apparatus.

4 Claims, 1 Drawing Sheet

6,050,132

METHOD AND APPARATUS FOR HYPERBARIC CHAMBER GAS DISCHARGE AND PRESSURE MANAGEMENT

FIELD OF THE INVENTION

This invention relates to gas pressure regulation of a hyperbaric chamber. More specifically, it relates to improvements venting of gas pressure from a hyperbaric chamber to regulate flow of fresh gas into and through the hyperbaric chamber while maintaining constant gas pressure in the hyperbaric chamber.

BACKGROUND OF THE INVENTION

Patient comfort and health in a hyperbaric chamber depends, among other factors, on good management of the chamber gas quality and pressure. Human occupancy in a pressure vessel alters the gas environment and requires constant monitoring to correct any rise in carbon dioxide levels or other unwanted gases. In the past this required an attendant monitoring the chamber to adjust an array of regulators and valves while observing meters to provide a flow of fresh gas into the chamber without a pressure drop. Despite operator diligence the addition or discharge of gas into a hyperbaric chamber often changes the chamber pressure. The present invention makes it easier to add fresh gas into a hyperbaric chamber while maintaining a measurable steady gas pressure in the chamber environment.

Breathable gas pressure regulators often use a diaphragm held between a sealed housing on one side, the gas conduit side, and a perforated housing on the other side, the ambient air pressure side. Any relative increase or decrease in gas pressure in the gas conduit side causes the diaphragm to deflect and pull or push a connected lever to open a spring loaded vent valve. The deflected vent valve thus delivers or vents breathable gas to or from a person through the gas conduit side. People in diverse environments such as scuba divers, aircraft pilots or hyperbaric chamber patients have used these gas regulating devices to deliver or exhaust breathing gas to or from their lungs.

This present invention takes gas regulation to a new level by using a hermetically sealed pressure vessel plenum containing an exhaust gas regulating device having sealed pressure piping means, that forms an airtight connection from a hyperbaric chamber to the atmosphere. The cavity of the sealed plenum also communicates through a valve with the hyperbaric chamber. A pressure gauge measures the gas.

DESCRIPTION OF PRIOR ART

While prior art used pressure regulators in a variety of ways to regulate pressure in containers there is nothing that anticipates the method and utility filled by this present invention. For example, U.S. Pat. No. 4,798,521 used a membrane pressure regulator to regulate pressure in a container using a vacuum pump, a value generator, two regulators, gas inlet and outlet valves and two pressure measuring means; resulting in a complex method of measuring and changing reference pressure levels, using too many elements not useful for hyperbaric chamber management. There is prior art that shows ways to manage gas in a chamber such as U.S. Pat. No. 5,488,967 with a complex series of valves for a vacuum deposition chamber, again using too many elements not useful for a hyperbaric chamber. Prior art in U.S. Pat. No. 4,033,247 showed a vent structure for equalizing the pressure on opposite side of a structure including a plenum with a moveable wall designed for relieving pressure in the floor of an aircraft but with elements not useful for a hyperbaric chamber. Prior art in U.S. Pat. No. 5,383,648 portrays a valve for controlling flow with a plenum and ports but uses an "o" ring for fluid flow and not a gas regulating device for gas venting. Prior art in U.S. Pat. No. 5,664,600 depicts a system to control the flow of air into and/or out of a process chamber using a two stage system using two regulators to change plenum pressure, a system with too many useless elements for hyperbaric chamber management. Some prior art used oxygen flow through regulation, in what is called a topical hyperbaric device, U.S. Pat. No. 5,688,236 with a spring loaded regulator vent, an element not designed for pressure management of a real hyperbaric chamber. Prior art dealing with actual hyperbaric chamber pressure management showed that different regulators have been attached such as in U.S. Pat. No. 3,877,427 but the regulator pressure element appears adjustable only with variable spring tension, the housing is not contained inside a plenum with a valve to control gas pressure from the hyperbaric chamber. Most regulator devices associated with humans in a pressurized environment are related to scuba type devices such as U.S. Pat. No. 4,784,129 or to other medical devices such as U.S. Pat. No. 4,452,242 with elements used to manage a diver's or patient's lung pressure, not directly managing the hyperbaric chamber pressure. Breathing gas pressure regulation devices such as U.S. Pat. No. 4,784,130 have no elements used to manage hyperbaric chambers. Prior art devices that regulate pressure in a hyperbaric chamber such as U.S. Pat. No. 5,685,293 involve a flow control system composed of a vent arrangement using a dump rate adjustment valve along with regulation of the intake gas. These obsolete elements require busy operator work to balance the intake regulation with exhaust valve function and requires constant surveillance to prevent pressure depletion. U.S. Pat. No. 4,633,859 uses obsolete throttling valve elements to manage hyperbaric chamber pressure while a supply of inert gas flows into the chamber. That cumbersome system requires delicate operator control between the inflow of gas and the outflow of exhaust if the chamber must be kept at a steady pressure. This brings us to the current need for a more convenient method to manage hyperbaric chamber environments.

DESCRIPTION OF THE PREFERRED EMBODIMENT

Figure 1:
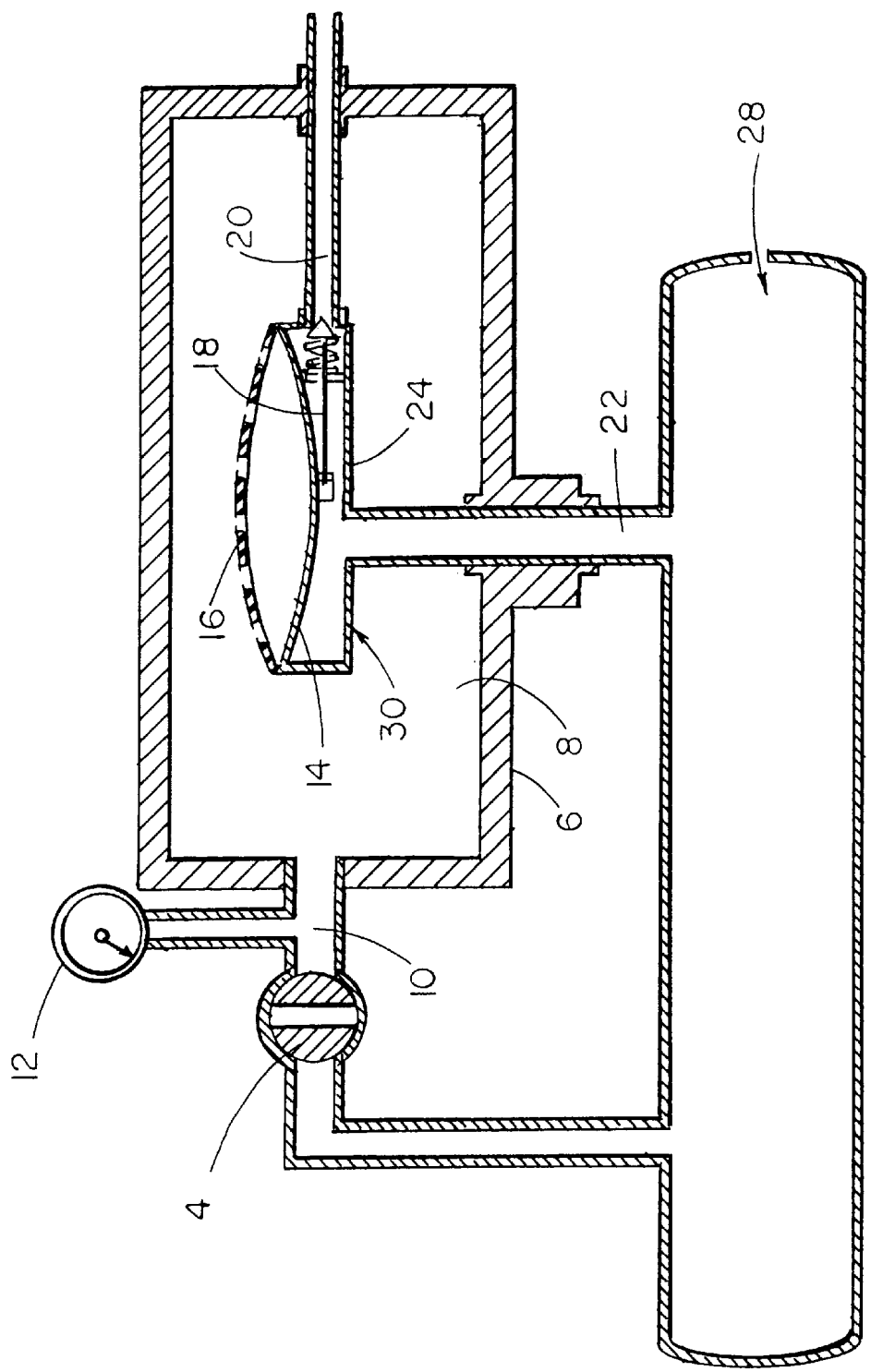

FIG. 1 shows a plenum 6 hermetically sealed pressure vessel with a gas filled cavity 8.

The plenum housing is composed of material certified to withstand at least a working pressure of 75 psig and is large enough to fit around a gas regulating device 30. The preferred gas regulating device has a diaphragm 14 connected to a control lever 18 on a spring loaded vent valve. It is suggested that the spring have enough tension to press the vent valve closed anytime the control lever has no diaphragm interference. The diaphragm is held in place between two housing members, a perforated member 16 and a solid member 24. The perforated member allows plenum cavity gas pressure against the diaphragm. The solid member conducts gas, against the other side of the diaphragm, from a sealed pressure piping means 22 that is connected to a hyperbaric chamber 28 through to another sealed pressure piping means 20 exiting the gas regulating device into the atmosphere. Another sealed pressure piping means 10 connected to the hyperbaric chamber conducts gas pressure through an operator controlled valve 4 to a plenum port open to the plenum cavity. A pressure gauge 12 has a connection to measure gas pressure in the plenum cavity. A material saving embodiment can use a branched tee connection for piping from the hyperbaric chamber through the valve 4 to the plenum pressure port, and along the same branch tee to the sealed pressure piping means connecting the gas regulating device intake inside the plenum cavity. Leaving the plenum cavity port valve open allows any increase in hyperbaric chamber pressure to equally press against both sides of the plenum's gas regulating device diaphragm in a pressure neutral mode. In this pressure neutral mode no gas will normally vent through the regulating device to the atmosphere. Thus, in this neutral mode the plenum cavity gas pressure equals the hyperbaric chamber gas pressure. While compressing the hyperbaric chamber, at some determined pressure level, the plenum port valve can be closed. After closure of the plenum port valve any continued flow of gas into the hyperbaric chamber will cause an increase in pressure against the diaphragm in the gas regulating device forcing it to deflect the control lever and open its vent valve. This action vents gas from the hyperbaric chamber to the atmosphere. The venting action continues until the hyperbaric chamber pressure equals the gas pressure inside the plenum cavity. Thus, using this hermetically sealed regulating system allows continuous flow of fresh gas into a hyperbaric chamber while conveniently maintaining hyperbaric chamber pressure.

What is claimed is:

1. Apparatus comprising: a hermetically sealed pressure vessel plenum having a cavity containing a gas regulating means; sealed pressure piping means forming a conduit to said gas regulating means through the sealed pressure vessel plenum from a hyperbaric chamber; sealed pressure piping means forming a conduit from said gas regulating means through the sealed pressure vessel plenum substantially open to atmosphere; sealed pressure piping means forming a conduit with a valve means connecting the hermetically sealed pressure vessel plenum cavity with a port on said hyperbaric chamber.

2. Apparatus defined in claim 1 wherein the hermetically sealed pressure vessel plenum is placed substantially outside the hyperbaric chamber.

3. A method for regulating hyperbaric chamber pressure using apparatus described in claim 1 whereby closure of a valve means shuts off gas flow in a sealed piping means from a hyperbaric chamber to a hermetically sealed pressure vessel plenum cavity whereby any additional gas pressure flowing into the hyperbaric chamber will flow in a sealed piping means to a gas regulator means inside the hermetically sealed pressure vessel plenum cavity whereby the excess gas vents to atmosphere thereby allowing refreshing gas flow through the hyperbaric chamber environment while conveniently maintaining a prescribed pressure level inside the hyperbaric chamber substantially equal to gas pressure inside said hermetically sealed pressure vessel plenum cavity.

4. A method for stabilizing pressure in a hyperbaric chamber while allowing continuous flow of gas into the hyperbaric chamber whereby gas pressure allowed to pass from the hyperbaric chamber to a cavity in a hermetically sealed pressure vessel plenum outside the hyperbaric chamber has a valve means whereby this gas pressure can be limited by closure of a valve; whereby this limited gas pressure in said cavity in conditions of higher relative gas pressure from said hyperbaric chamber results in discharge of the relative higher gas pressure through a sealed pressure piping means into a gas regulating means inside the hermetically sealed pressure vessel plenum cavity, said gas regulating means thus vents the relative higher gas pressure through sealed pressure piping means open to atmosphere.

* * * * *